B. E. VINCENT.
AUTOMATIC VARIABLE POWER TRANSMITTING SYSTEM.
APPLICATION FILED FEB. 15, 1913.

1,199,640.

Patented Sept. 26, 1916.
4 SHEETS—SHEET 2.

Witnesses
P. C. Gibson
John J. McCarthy

Inventor
Bee E. Vincent.
By Victor J. Evans
Attorney

B. E. VINCENT.
AUTOMATIC VARIABLE POWER TRANSMITTING SYSTEM.
APPLICATION FILED FEB. 15, 1913.

1,199,640.

Patented Sept. 26, 1916.
4 SHEETS—SHEET 4.

Witnesses
F. C. Gibson.
John J. McCarthy

Inventor
Bee E. Vincent.
By Victor J. Evans
Attorney

UNITED STATES PATENT OFFICE.

BEE ELMER VINCENT, OF SWIFTS, OHIO.

AUTOMATIC VARIABLE POWER-TRANSMITTING SYSTEM.

1,199,640.          Specification of Letters Patent.      Patented Sept. 26, 1916.

Application filed February 15, 1913. Serial No. 748,626.

*To all whom it may concern:*

Be it known that I, BEE ELMER VINCENT, a citizen of the United States, residing at Swifts, in the county of Washington and State of Ohio, have invented new and useful Improvements in Automatic Variable Power-Transmitting Systems, of which the following is a specification.

This invention relates to improvements in variable power transmission systems and has particular application to an automatic variable speed gear system.

In carrying out the present invention, it is my purpose to provide a variable speed power transmission system which will be found especially useful where hydrocarbon explosive engines are employed to drive a load and wherein the speed of the driving shaft will be automatically changed in accordance with the fluctuations of the load thereby enabling the engine to operate at a substantially constant speed irrespective of load variations.

It is also my purpose to provide a system of the class described in which the speed of the engine or prime mover will be automatically changed when the speed of the driving shaft is varied thereby eliminating choking of the engine and other bad effects incident to the sudden application of a load to a hydrocarbon engine running at a constant speed.

Furthermore, I aim to provide an automatic variable power transmission system which will be entirely automatic in action and manually controlled and wherein the speed of the driving shaft may be reversed when such is desired or deemed necessary, as for instance, when the system is employed for driving motor vehicles.

With the above and other objects in view, the invention consists in the construction, combination and arrangement of parts hereinafter set forth in and falling within the scope of the claims.

Figure 1:
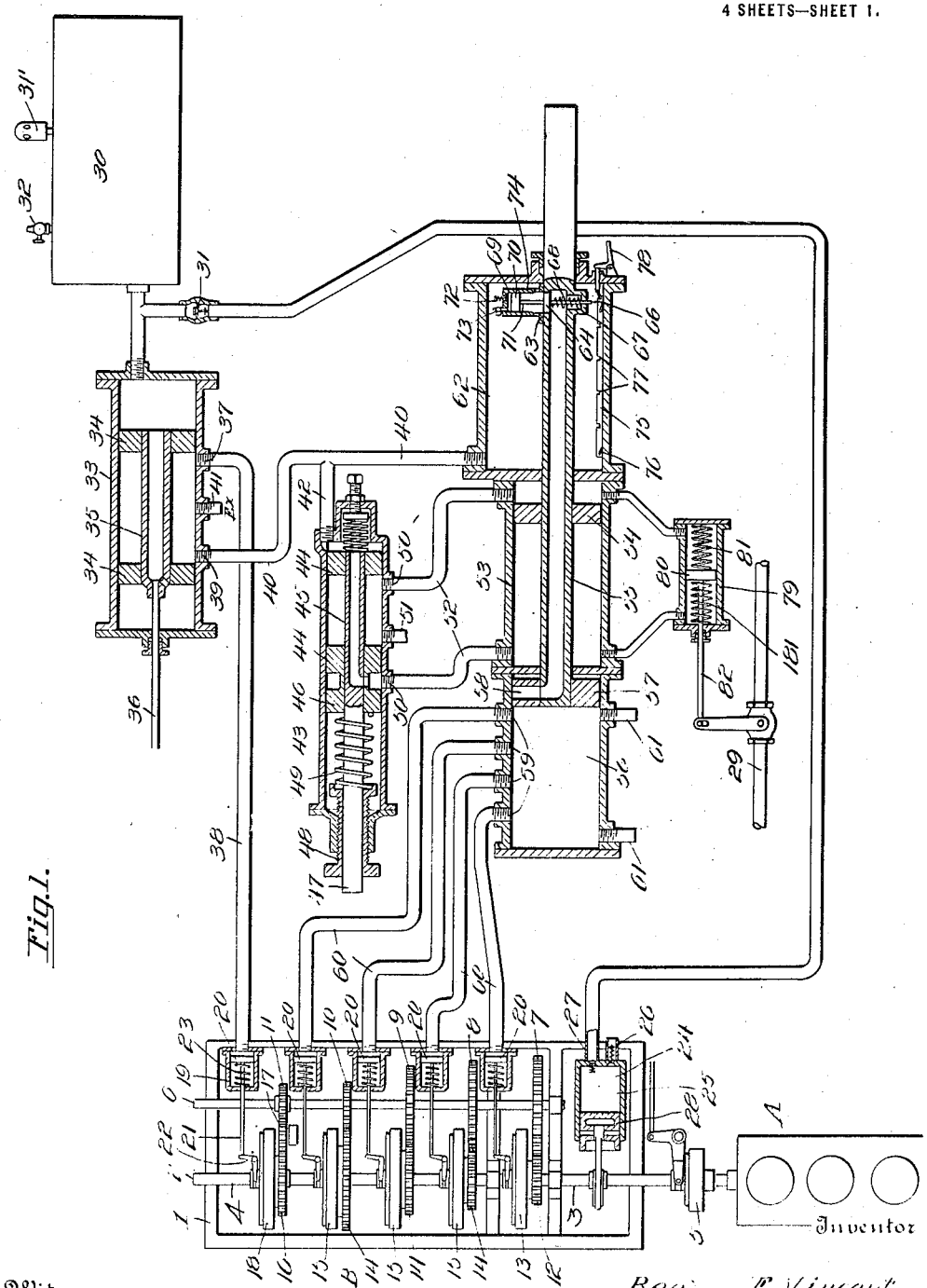
Figure 2:
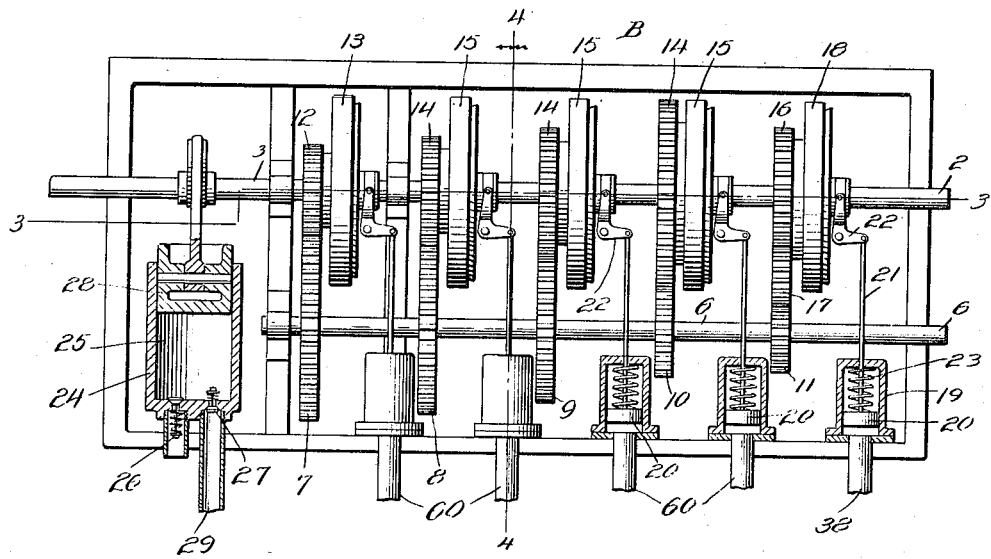
Figure 3:
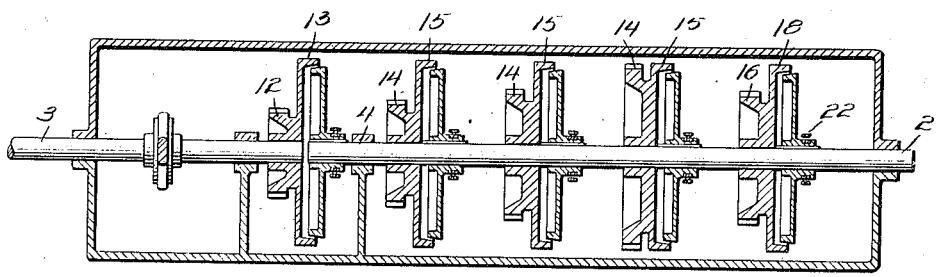
Figure 4:
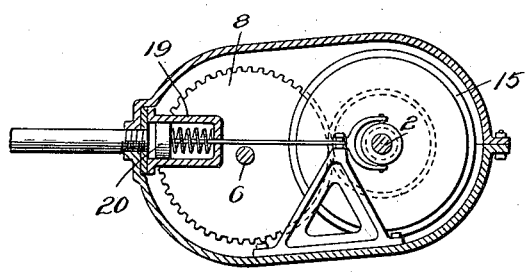

In the accompanying drawings; Figure 1 is a diagrammatic view of an automatic variable power transmission system constructed in accordance with my invention. Fig. 2 is an enlarged top plan view of the speed gear system and pump employed, the cover of the gear case being removed and the pump shown in section. Fig. 3 is a longitudinal sectional view on the line 3—3 of Fig. 2. Fig. 4 is an enlarged transverse sectional view on the line 4—4 of Fig. 2.

Figure 5:
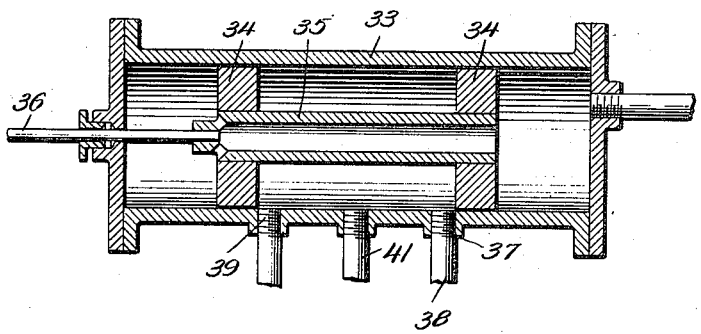
Figure 6:
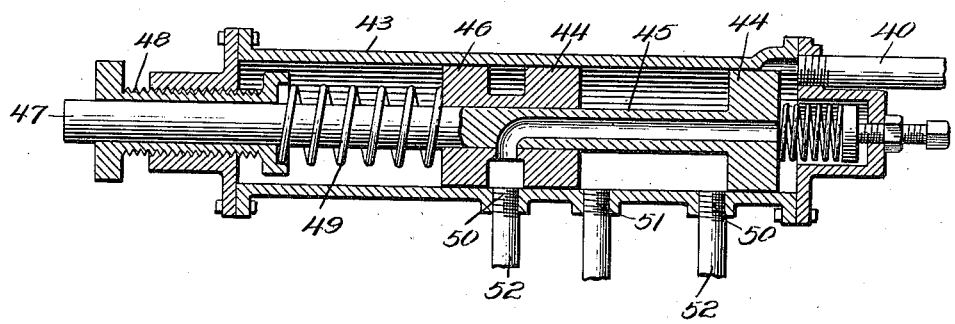
Figure 7:
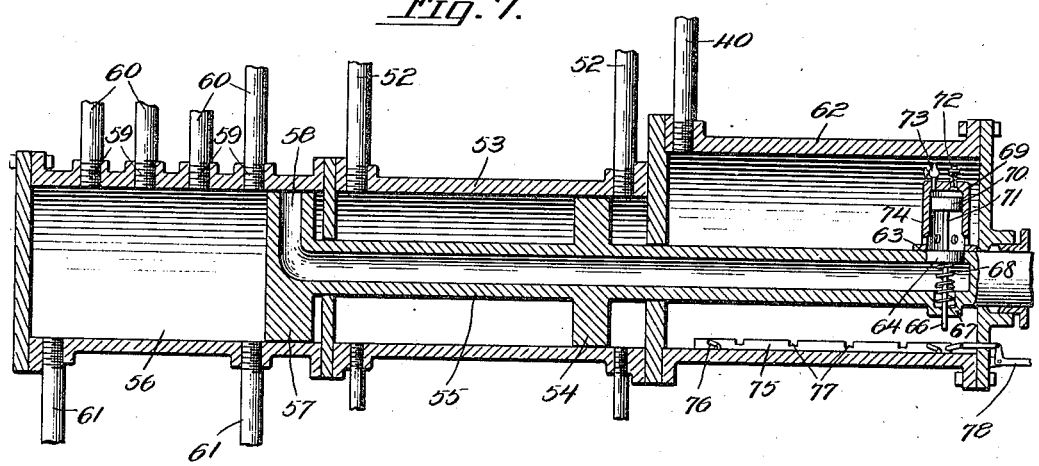

Fig. 5 is an enlarged longitudinal sectional view through the controlling valve. Fig. 6 is a similar view through the setting device for the automatic valve. Fig. 7 is a longitudinal sectional view through the automatic speed regulating valve.

Referring now to the accompanying drawings in detail, A indicates a suitable form of prime mover, in the present instance, in the form of a reciprocating gas engine, while B indicates a change speed gear apparatus disposed within a suitable housing 1 and composed of a main shaft 2 disposed longitudinally of the housing and journaled in the opposite end walls thereof and formed of axially alining sections 3 and 4, the section 3 of the main shaft alining axially with the engine shaft and adapted to be directly coupled thereto by means of a suitable form of clutch 5. Also journaled in the housing and extending longitudinally thereof in parallelism with the main shaft 2 and spaced apart from the latter is a counter or jack shaft 6 having keyed thereon a number of toothed gear wheels 7, 8, 9, 10 and 11 appropriately spaced apart.

Keyed to the inner end of the section 3 of the main shaft, that is the end of such section disposed within the housing 1 is a toothed gear pinion 12 meshing with the teeth of the gear 7 on the jack shaft and carrying the female member of a friction clutch 13, the male member of the latter being splined on the section 4 of the main shaft for sliding movement so that the sections 3 and 4 of the main shaft may be directly coupled. Meshing with each gear wheel 8, 9, 10 on the jack shaft is a pinion 14 loose upon the section 4 of the main shaft and carrying the female member of a clutch 15, the male member of the latter being splined on the shaft for sliding movement so as to be placed in and out of driving engagement with the female member of the clutch. In order that the section 4 of the main drive shaft may be driven from and in a direction reverse to that of the section 3 of such shaft, a gear wheel 16 loosely surrounds the section 4 and meshes with an idle pinion 17 suitably journaled within the casing 1 and, in turn, meshing with the gear 11 on the jack shaft, the gear 16 on the main shaft carrying the female member of a clutch 18 adapted to place the gear 16 in and out of driving engagement with the main shaft, the male member of the clutch 18 being splined on the shaft for sliding movement so that the same may be engaged with and disengaged from the female member. By means of this construction, it will be seen that the section 4 of the main drive shaft, such section having the free end thereof coupled up with the load, may be driven at various speeds with respect to the section 3 or in a direction reverse to that of the last-named section, or coupled directly to the section 3 so as to obtain what is known as a direct drive. For instance, should it be desired to rotate the section 4 of the shaft 2 at a relatively slow speed with respect to the speed of rotation of the section 3, the male member of the clutch 15 of the gear 14 on the main shaft meshing with the gear 10 of the jack shaft, is moved into engagement with the female member of such clutch whereby motion is imparted to the section 4 of the main shaft from the engine through the medium of the pinion 12 and the section 3 of the main shaft gear 7 on the jack shaft 6 and the gear 10 and respective gear 14, it being assumed, of course, that the engine is operating.

The actuating mechanism for each clutch 13, 15 and 18 comprises, in the present instance, a cylinder in which is mounted for sliding movement a piston 20 having a piston rod 21 extending outwardly of one end of the cylinder and connected at its free end to one arm of a bell crank lever 22 pivoted at its bight upon a suitable support within the casing 1 and having the free arm thereof suitably connected to the male member of the respective clutch, a spring 23 encircling the piston rod 21 within the cylinder 19 and having one end in engagement with the respective end wall of the cylinder and the opposite end abutting the confronting face of the piston, the spring acting normally to hold the male member of the respective clutch disengaged from the female member thereof.

A pump 24 is, in the present instance, mounted within the housing 1 of the change gear system and comprises a cylinder 25 having a valve controlled intake port 26 and a valve controlled discharge port 27, a piston 28 being mounted within the cylinder 25 for reciprocation and is connected in any appropriate manner with the section 3 of the main shaft 2 so that in the rotation of the main shaft the pump will be operated. Connected to the cylinder 25 of the pump and in communication therewith by way of the discharge port 27 thereof is an air conduit 29 in communication with a reservoir or storage tank 30, a check valve 31 being located in the conduit 29 at an appropriate point to prevent the return of air from the reservoir, the latter being equipped with some suitable form of safety valve 31' and a vent cock 32. The vent cock 32 is normally open so that the air in the tank 30 under pressure may gradually leak from the tank to facilitate the operation of the system. In open communication with the storage tank 30 is the cylinder 33 of a controlling valve, the valve being of the balanced type and composed of a pair of disks 34, 34 having central openings to receive the ends of the tube 35 interconnecting the disks and establishing communication between the ends of the cylinder 33, an actuating rod 36 being suitably connected to one of the heads of the valve so that the same may be moved from one side of the cylinder to the other and whereby a rectilinear motion may be imparted to the valve. The cylinder 33 is formed with a discharge port 37 under the control of the valve and connected to the cylinder at the discharge port 37 therein is one end of a conduit 38, the free end of the latter being tapped onto the cylinder 19 of the piston controlling the clutch 18 of the reversing gear of the change gear system. A second discharge port 39 is formed in the cylinder 33 at an appropriate distance from the discharge port 37 and establishes communication between the cylinder and the conduit 40, while an exhaust port 41 is also formed in the cylinder 33 at a point between the discharge ports 37 and 39 so that, when conditions warrant, the air let into the conduits 38 and 40 may be permitted to discharge into the atmosphere, as will more fully appear hereinafter. Tapped onto the conduit 40 by way of a short section of piping or the like 42 is a cylinder 43 of what may be termed a valve setting device composed, in the present instance, of a pair of disks 44, 44 adapted for sliding movement within the cylinder 43 and provided with centrally arranged axially alining openings to receive a tube 45 by means of which communication is established between the outer faces of the disks, and a disk or head 46 preferably connected to the piston valve composed of the disks 44 and the tube 45 and provided with a shank 47 extending outwardly of one end of the cylinder 43 and mounted for sliding movement within an adjustable gland nut 48, an expansion spring 49 being coiled about the shank 47 between the inner end of the gland nut 48 and the confronting face of the disk or head 46, the tension of the spring 49 being capable of adjustment under the action of the adjustable gland nut 48.

The cylinder 43 of the valve setting device is provided with discharge ports 50, 50 controlled by the disks 44, 44 of the valve of the setting device, and an exhaust port 51 located between the discharge ports 50, 50 so that, when it is necessary, the ports 50, 50 may be opened to the atmosphere. Leading from the discharge ports 50, 50 of the valve setting device are air conduits 52, 52 opening into a cylinder 53 at the opposite ends thereof, while mounted within the cylinder 53 for sliding movement is a piston 54 carrying a hollow piston rod or tube 55 extending outwardly of the opposite ends of the cylinder 53.

Located adjacent to one end of the cylinder 53 and preferably, although not necessarily connected thereto, is a chamber 56 within which is mounted for rectilinear motion an automatic speed regulating valve 57 composed in the present instance of a disk connected to the adjacent end of the tube or piston rod 55 and in open communication therewith by means of an angular bore 58. The chamber 56 is provided with a series of ports 59 from each of which leads a tube or the like 60 having the free end thereof in open communication with one of the cylinders 19 which controls the respective clutches 13 and 15, the bore 58 in the automatic speed regulating valve 57 being adapted to be brought into registration with one or the other of the ports 59, in accordance with the speed of the engine. The chamber 56 is also formed with exhaust ports 61 disposed adjacent to the opposite ends thereof. The opposite end of the hollow piston rod or tube 55 extends through a chest 62 in open communication with the conduit 40 and the portion of the piston rod within the chest 62 is provided with an opening 63 designed to establish communication between the chest and the interior of the tube or piston rod. This opening 63 is controlled by means of a head 64 mounted upon a stem 66 sliding within an opening formed in the lower wall of a depression 67 formed in the piston rod at a point diametrically opposite the opening 63 therein and encircled by a coiled expansion spring 68 having one extremity bearing upon the bottom wall of the depression 67 and the opposite end bearing against the adjacent face of the head 64. Extending upwardly from the portion of the piston rod within the chest 62 and surmounting the opening 63 in such rod is a cylinder 69 in which is mounted a piston 70 connected by means of a piston rod 71 with the head 64 and adapted to be drawn downwardly within the cylinder when the head 64 is forced downwardly under the action of the air within the chest 62, a valve 72 being carried by the head of the cylinder 69 so that as the piston 70 moves downwardly within the cylinder air will be drawn into the same.

73 is a vent cock in the head of the cylinder 69 whereby the air drawn into such cylinder may be gradually discharged under the action of the piston for a purpose which will presently appear. This cylinder 69 is supported above the opening 63 so that the air within the chest 62 may effectively act upon the head 64 to open the opening 63 and establish communication between the hollow piston rod and the chest. A locking bar 75 is pivoted at one end as at 76 to the lower wall of the chest 62 and has the upper surface thereof formed with notches 77 appropriately spaced apart and adapted to receive the free end of the stem 66 when the head 64 is forced downwardly so as to lock the piston 54 within the cylinder 53 against further movement until the spring 68 has forced the head 64 into normal position to close the opening 63, the piston 70 within the cylinder 69 being moved upwardly to expel the air gradually from the cylinder by way of the vent cock 73. A handle 78 extends outwardly of the chest 62 and is connected with the free end of the locking bar 75 so as to throw the latter about its pivot 76 and form a permanent lock between the stem 66 and the bar thereby eliminating further movement of the automatic speed regulating valve 57 under the action of the piston 54 until the locking bar is released.

From the foregoing description taken in connection with the accompanying drawings, the construction, mode of operation and manner of employing my invention will be readily apparent.

Assuming the prime mover A to be operating and the controlling valve in a position to establish communication between the reservoir 30 and the conduit 40 by way of the tube 35 of the valve and a load on the main shaft of the change gear system, it will be seen that in the continued operation of the main shaft the pump 24 will force air into the reservoir or container 30, the air passing from the latter to the cylinder 43 of the valve setting device by way of the controlling valve and conduit 40. The air entering the cylinder 43 through the section of piping 42 acts upon the outer end of the adjacent disk 44 and passes through the tube 45 and also acts upon the head 46 whereby the valve setting device is moved against the action of the spring 49 to open communication between the conduit 40 and the conduit 52 leading into the cylinder 53 at the right hand end thereof as shown in Fig. 1. As the air enters the cylinder 53 the piston 54 is influenced thereby and moves toward the left thereby sliding the automatic speed regulating valve 57 and establishing communication between the hollow piston rod or tube 55 and the tube 60 leading into the cylinder 19 controlling the clutch 15 of the gear 14 on the main shaft in mesh with the gear 10 on the jack shaft. Simultaneously with the flow of air into the cylinder 43 of the valve setting device, such air enters the chest 62 and acts upon the head 64 to move the latter downwardly against the action of the spring 68 whereby the air is permitted to flow through the hollow piston rod, the bore 58 in the automatic speed regulating valve, the respective discharge port 59 of the chamber 56, the respective tube 60 and into the said cylinder 19, thereby moving the piston 20 within such cylinder to effect the clutching up of the respective gear 14 to the section 4 of the main shaft whereby motion is transmitted to the said section in the manner previously described. As the head 64 moves downwardly, the stem 66 is also moved downwardly against the action of the spring surrounding the stem 66 and bearing upon the head 64 thereby forcing the free end of the stem 66 into engagement with the locking bar 75 so that as the piston 54 continues in its path of movement the free end of the stem enters the first notch 77 with the effect to lock the piston against further movement. However, as the piston 70 also moves downwardly with the head 64 and draws air into the cylinder 69 and as the cylinder is provided with the vent cock 73 and the pressures on the opposite sides of the head 64 will balance the pressures whereby the spring 57 will react and restore the head 64 to normal position after a certain interval of time has elapsed, thereby disengaging the stem 66 from the adjacent notch 77. As the pressures on both sides of the head 64 are balanced, the pressure in the hollow piston rod and cylinder 19 in communication therewith will remain the same as the pressures in the chest 62 and cylinder 53 thereby holding the piston valve 57 in actuated position. As the speed of the engine increases, the pressure within the reservoir 30 is correspondingly increased thereby causing the automatic speed regulating valve 57 to travel through the chamber 56 in such manner as to step up the speed of the main driving shaft, as will be readily understood. Should the speed of the engine decrease for any reason, as in the sudden application of a load to the main shaft the pressure within the reservoir will be correspondingly decreased whereby the valve setting device will move to a position to establish communication between the conduit 40 and the conduit 52 leading into the cylinder 53 at the opposite side of the piston 54 therein thereby moving the automatic speed regulating valve in a reverse direction so as to step down the speed of the section 4 of the main drive shaft, as will be readily understood. When it is desired to reverse the direction of rotation of the section 4 of the main drive shaft, the controlling valve is moved to a position to establish communication between the reservoir and the conduit 38 and open the conduit 40 to the atmosphere by way of the exhaust port 41, thereby causing the piston 19 within the cylinder 20 controlling the clutch 18 to operate to engage the male member of such clutch with the female member thereof. The valve 44 moves slowly under the action of the air flowing into the cylinder 43, owing to the slow escape of air from the tank 30 through the cock 32. Hence, the pressure in the cylinder 53 acting upon the piston 54 will increase slowly and steadily so as to move the piston 54 and the valve 57 gradually, thereby permitting the speed to be stepped up and down and the locking device to hold the valve 57 in actuated position.

It will be seen that the automatic locking device prevents continuous sliding movement of the automatic speed regulating valve under the action of the piston 54. Thus, the speed of the main drive shaft is stepped up slowly and gradually and without unnecessary strain on the engine.

A cylinder 79 has open communication at the opposite ends thereof with the cylinder 53 at the opposite sides of the piston 54 and has mounted therein a piston 80 normally maintained centrally of the cylinder by means of springs 81, 81 disposed at the opposite sides of the piston, the piston being provided with a piston rod 82 connected to the throttle lever of the engine A. By means of this construction, it will be seen that as the change gear system is stepped up, the throttle lever will be opened to feed more fuel to the engine thereby preventing stalling of the engine while, on the contrary, should the change speed gear system be operated to decrease the speed of the main shaft, the piston 80 within the cylinder 79 will be acted upon by the air from the cylinder 53 to close the throttle and so prevent "racing" of the engine.

It will be noted that I have provided an automatic variable power transmission system wherein the speed of the main shaft is automatically stepped up and down in accordance with the conditions prevailing and wherein the speed of the engine is automatically varied in accordance with the load.

While I have herein shown and described one preferred form of my invention by way of illustration, I wish it to be understood that I do not limit or confine myself to the precise details of construction herein described and delineated, as modification and variation may be made within the scope of the claims and without departing from the spirit of the invention.

I claim:

1. In an automatic variable speed gear system, a hydrocarbon engine, a shaft adapted to be driven therefrom, change speed mechanism interposed between said engine and shaft whereby the speed of the shaft may be stepped up and down relatively to the speed of the engine, automatic fluid operated means for actuating said change speed mechanism, and manually controlled means controlling the operation of said fluid operated means.

2. In an automatic variable speed gear system, a hydrocarbon engine, a shaft adapted to be driven from said engine, change speed mechanism interposed between said engine and shaft, fluid operated means for actuating said mechanism to vary the speed of said shaft relatively to the speed of said engine, and means operated from said fluid controlled means for varying the engine speed.

3. In an automatic variable speed gear system, a hydrocarbon gas engine, a shaft adapted to be driven therefrom, change speed gearing interposed between said shaft and engine and including clutches whereby the speed of the shaft may be stepped up and down, fluid operated devices controlling said clutches, a pump operated from said engine, a reservoir in communication with the pump, a valve setting device controlled by said pump and controlling said clutch operating devices whereby the speed of the shaft may be stepped up and down, and a controlling valve controlling the communication between said setting device and reservoir.

4. In an automatic variable speed gear system, a hydrocarbon gas engine, a shaft adapted to be driven therefrom, change speed gearing interposed between said shaft and engine and including clutches whereby the speed of the shaft may be stepped up and down, fluid operated devices controlling said clutches, a pump operated from said engine, a reservoir in communication with the pump, a valve setting device, a speed regulating valve controlled by said setting device and controlling said clutch operating devices whereby the speed of the shaft may be stepped up and down, a controlling valve controlling the communication between said setting device and reservoir, and means for locking said automatic speed regulating device against movement.

5. In an automatic variable speed gear system, a hydrocarbon gas engine, a shaft adapted to be driven therefrom, change speed gearing interposed between said shaft, and engine and including clutches whereby the speed of the shaft may be stepped up and down, fluid operated devices controlling said clutches, a pump operated from said engine, a reservoir in communication with the pump, a valve setting device, an automatic speed regulating valve controlled by said setting device and controlling said clutch operating devices whereby the speed of the shaft may be stepped up and down, a controlling valve controlling the communication between said setting device and reservoir, and automatic means for locking said automatic speed regulating device against movement.

In testimony whereof I affix my signature in presence of two witnesses.

BEE ELMER VINCENT.

Witnesses:
HERMAN RIECKER,
RALPH SCOTT.